United States Patent
Hatch

[15] 3,691,997
[45] Sept. 19, 1972

[54] TEMPERATURE CONTROLLED WATER DISPENSING DEVICE FOR ANIMALS

[72] Inventor: Clifford V. Hatch, P.O. Box 6654, Lubbock, Tex. 79413

[22] Filed: May 7, 1971

[21] Appl. No.: 141,235

[52] U.S. Cl. ................... 119/71, 119/51.11, 119/73
[51] Int. Cl. ............................................. A01k 9/00
[58] Field of Search............ 119/71, 73, 51.11, 51, 75

[56] References Cited

UNITED STATES PATENTS 3,049,094   8/1962   Smith ......................... 119/75
3,192,902   7/1965   Gammill ................. 119/51.11
3,313,272   4/1967   Moloney ................. 119/51.11

Primary Examiner—Aldrich F. Medbery
Attorney—Charles W. Coffee

[57] ABSTRACT

Animals such as hogs are provided drinking water from drinking nipples which are connected into the side of a barrel-like container. To prevent the nipples from becoming frozen in cold weather, water is circulated directly into and out of the nipples, responsive to a temperature measuring element.

11 Claims, 4 Drawing Figures

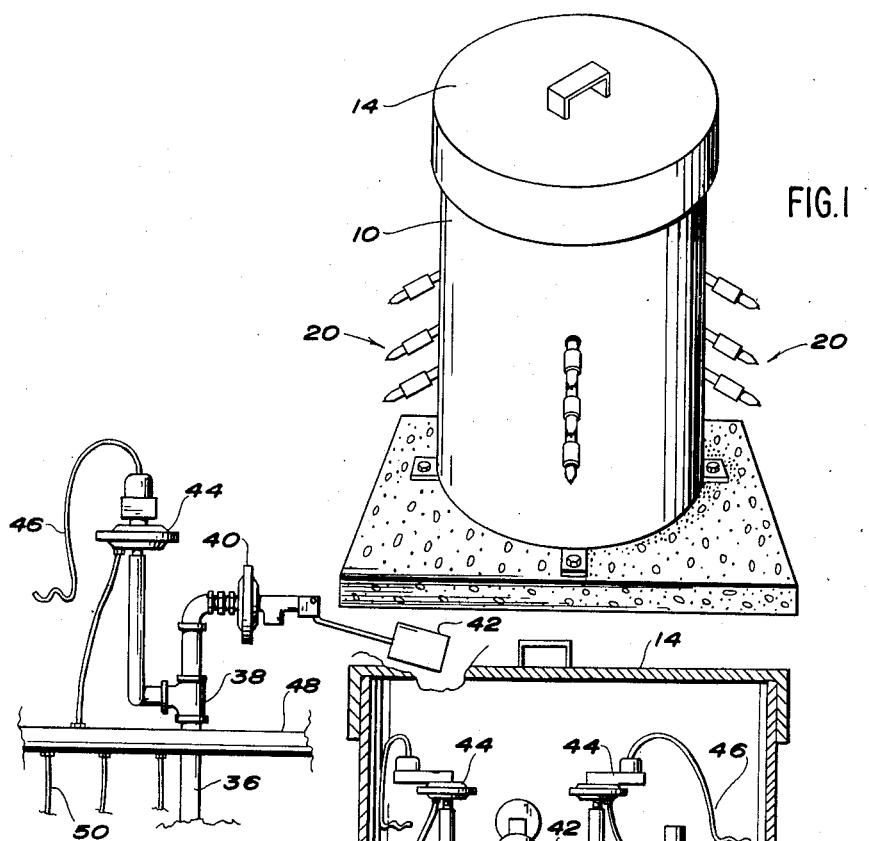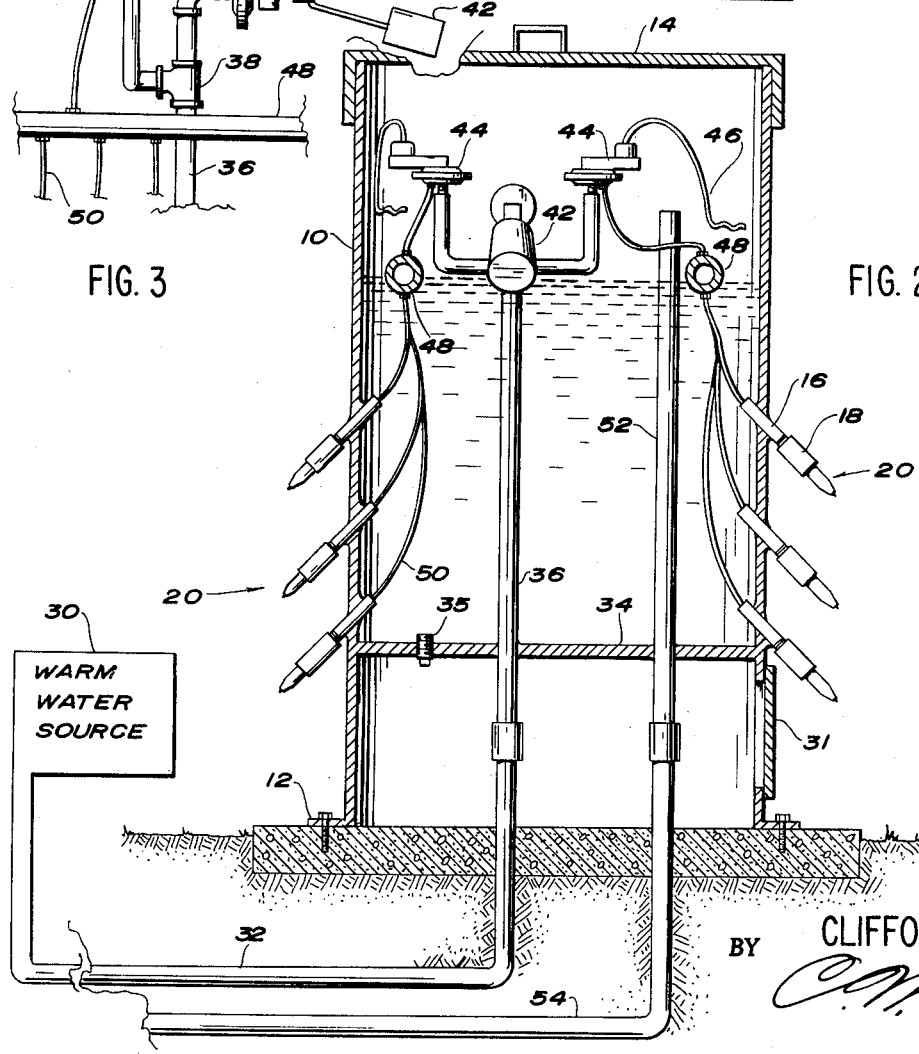

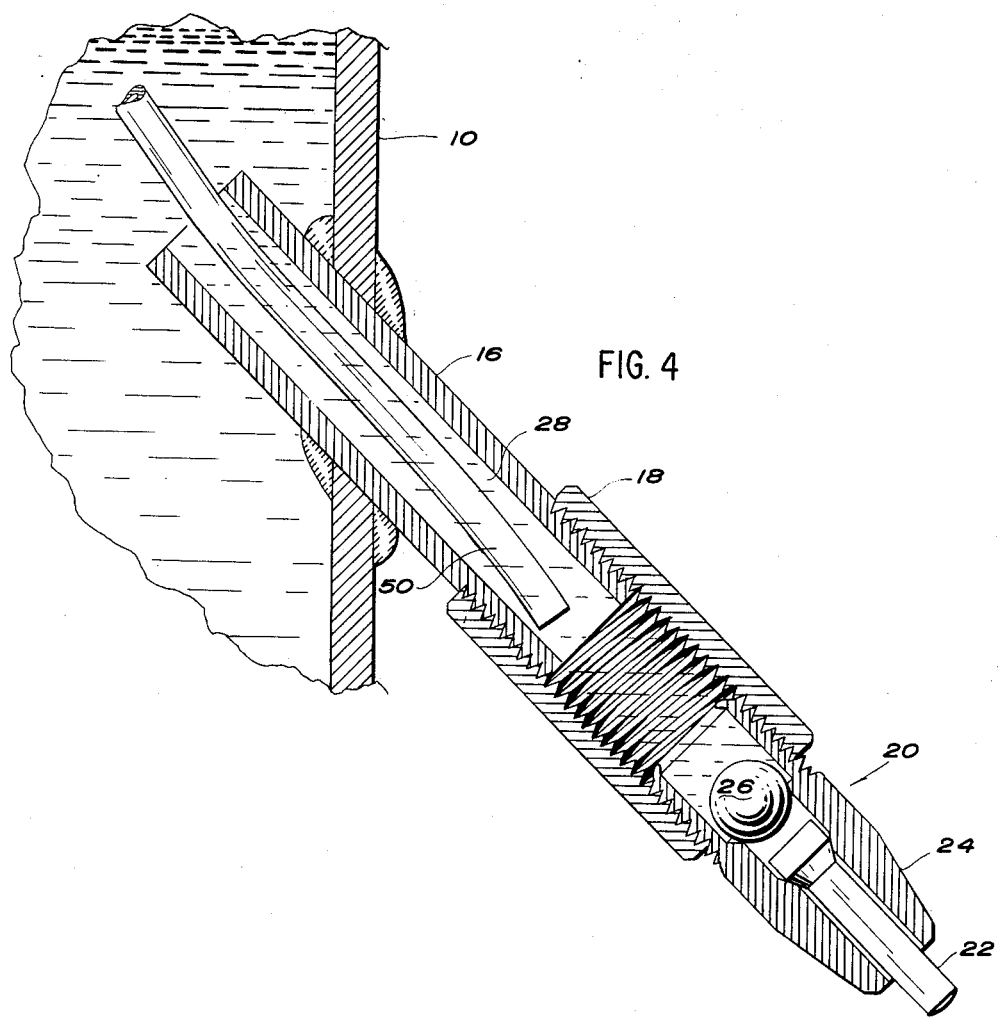

TEMPERATURE CONTROLLED WATER DISPENSING DEVICE FOR ANIMALS

BACKGROUND OF THE INVENTION

1. Field of the Invention

This invention relates to providing water to domestic animals (119/72).

2. Description of the Prior Art

Animal drinking nipples are known to the art, e.g. see MALLINSON Patent No. 3,477,471. However, in the prior art, they have generally been attached into pipelines or along other conduits. To prevent them from freezing, either electrical resistance tapes have been run along next to the pipeline or waterproof heating tapes have been run inside of the conduit.

SUMMARY OF THE INVENTION

1. New and Different Function

This invention solves the freezing problem of animal drinking nipples by having them connected to a container. Ordinarily, the water is supplied to the nipple directly from the container inasmuch as there is an open passageway between the nipple and the container. However, in severe cold temperature, the nipples are kept from freezing by having a supply of warm warm water flowing directly into the drinking nipple. The warm water is supplied from an underground line. The warm water supplied at cold temperatures circulates back freely into the container. An overflow pipe is provided to prevent the container from overflowing the top.

2. Objects of this Invention

An object of this invention is to provide drinking water for animals.

Another object is to provide a watering device which does not freeze in cold weather.

Further objects are to achieve the above with a device that is sturdy, compact, durable, simple, safe, efficient, versatile, and reliable, yet inexpensive and easy to manufacture, install, adjust, operate, and maintain.

Still further objects are to achieve the above with a method that is versatile, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not to the same scale.

BRIEF DESCRIPTION OF THE DRAWINGS

FIG. 1 is a perspective view of a watering system according to this invention.

FIG. 2 is a sectional view thereof with parts shown schematically.

FIG. 3 is a side elevational view of the water supply head.

FIG. 4 is a detail of one drinking nipple with the warm water tube therein.

DESCRIPTION OF THE PREFERRED EMBODIMENT:

The preferred embodiment is described with reference to a waterer for hogs.

It may be seen that a cylindrical barrel-like container 10 is mounted upon a suitable base with suitable ears 12 for attaching it. Cover 14 is provided to keep excessive foreign material from entering the water and also to prevent the water from cooling rapidly.

A plurality of short pipes 16 are welded through the walls of the container 10. Cuff 18 is threaded onto each of the pipes 16. Animal drinking nipple 20 is threaded into each of the cuffs 18. As stated before, these animal drinking nipples are well known and are commercially available on the market. In essence, each has poppet valve 22 with a stem extending below the end of sleeve 24. The valve proper of the valve stem 22 sets on a seat within the sleeve 24. Above this, ball valve 26 sets upon a seat immediately above the poppet valve 22. When a hog comes to drink and pushes on the valve stem 22, it unseats that valve and, also, the ball valve 26 so water flows from the container 10 through the open passageway 28 and through the drinking nipple 20.

I have provided a plurality of these drinking nipples 20 on the container 10 as may be seen in FIG. 1. I have arranged them at different heights for the convenience of different sizes and ages of hogs. Also, I have arranged them in different locations around the container 10 so, if desired, fences may be made to terminate at the container so one set of drinking nipples open into one pen and another set or row of drinking nipples open into another pin.

Water is supplied to the container 10 from a source of warm water 30. This source of warm water can be normal well water inasmuch as in the winter time it is warm enough to be warm as compared to freezing water. However, if desired, it can be additionally heated to some reasonable temperature such as 75° or 80° F. The source of warm water flows through underground pipe 32. The underground pipe 32 is buried below the frost line for the vicinity involved. Under the container 10, the pipe rises up and passes through bottom 34 of the container 10. A water tight connection is made between riser pipe 36 and the bottom 34, the riser pipe being a continuation of the underground pipe 32. The bottom 34 is raised from the bottom of the container 10 and a door 31 is provided into the space below at bottom 34. This space provides a convenient area for unions or other connections to connect the water to the underground pipe 32 and the drain line. Drain plug 35 is provided in the bottom 34.

Tee 38 is connected to the top of the riser pipe 36. Float valve 40 is connected to one outlet of the tee 38; the float valve is a means in the container 10 for adding water to the container if the container's water falls below the preset level. The preset level being that level to which float 42 is set. The water which is added by the float valve is called "level water" to distinguish it from the "thawing water" which is the water added by the temperature responsive valves 44. The temperature responsive valves 44 are connected to the other outlet of the tee 38. I use two temperature responsive valves 44, for double safety in case one should not respond, and also for convenience in structurally arranging the equipment in the top of the container 10.

Temperature responsive valves are well known as are float valves. These particular valves are responsive to the temperature of the sensing tube 46, which I find convenient to be stretched out within the container 10 above the water line. It will be understood that the riser pipe 36 itself is a source of warm water to the float valve 40 and to the temperature valves 44 which are sensed by the sensing tubes 46.

The thawing water from the temperature responsive valves 44, flows into the passageway 48, which is into or onto the animal drinking nipples 20. It is desirable to have an equal flow on each nipple 20 inasmuch as each nipple will be subject to approximately the same temperature. All of the flow from each of the temperature valves 44 flow into header 48 and then thawing water flows from the header through thawing tubes 50 to the individual animal drinking nipples 20 as seen in FIG. 4, and then back up the passageway 28 of pipe 16 into the water in the tank 10. The head of the water, both inside and outside of the thawing tubes 50 is the same regardless of the height of the nipples 20 to which it goes. Also, there is only slight difference in the friction loss through the tube because of the different lengths of the tube 50.

As seen particularly in FIG. 4, each thawing tube 50 extends within the passageway 28 which leads to the animal drinking nipple 20 and flows warm, thawing water thereon to prevent the animal drinking nipples from freezing. Therefore, drinking water is available to the hogs at all times, even though the temperature is well below freezing.

Inasmuch as it may require more thawing water to the nipples to keep them thawed than the animals normally drink, an overflow pipe 52 is provided. The top of the overflow pipe is above the normal low level of the water, the low level of the water being the level of the water maintained by the float 42 of the float valve 40. However, the top of the overflow pipe is below the top of the container 10 so water does not flow out of the top of the container which makes an undesirable puddle in the animal pen. The overflow pipe 52 is connected to drain pipe 54 which is located immediately below the underground pipe 32. The underground pipe 32 will carry warm water; therefore, by having the drain pipe 54 immediately below the underground pipe 32, there is additional assurance that the drain pipe 54 will not freeze. The drain pipe 54 may be perforated so the overflow water drains out of the drain pipe 54 and, also, the drain pipe 54 may be conducted to some place of disposal such as a pit.

Therefore, it may be seen that I have provided a system for supplying water to domestic animals from nipples without the nipples freezing at low temperatures.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. The method of providing drinking water to animals comprising:
   a. placing a container having at least one animal drinking nipple thereon in a place available to the animals,
   b. adding level water from a source to the container responsive to a low level of water in the container,
   c. flowing thawing water from the source directly into the animal drinking nipple responsive to cold temperatures,
   d. circulating the thawing water from the nipple interior back into the container, and
   e. draining water from the container from a level higher than the low level wherein level water is added.

2. An animal watering device comprising:
   a. a container,
   b. a source of water under pressure communicating with the container,
   c. float valve means in the container connected to the source for adding level water to the container if the level therein falls below a preset level,
   d. at least one animal drinking nipple conveniently positioned on the container for the animal,
   e. a free fluid water passage connecting the container to the animal drinking nipple,
   f. temperature means connected to the source for flowing thawing water responsive to low temperatures, and
   g. an outlet from said temperature water flow means directed to within said animal drinking nipple and providing water circulation into and out of said nipple.

3. The invention as defined in claim 2 with the additional limitations of
   h. said source of water under pressure including an underground pipe,
   j. which enters the bottom of the container and
   k. passes through the container to the valve means and temperature means.

4. The invention as defined in claim 2 with the additional limitation of
   h. said temperature means being responsive to low temperatures within the container above water level therein.

5. The invention as defined in claim 2 with the additional limitations of
   h. an overflow pipe within the container having
   j. an upper end above the float valve means level, and
   k. extending through the bottom of the container.

6. The invention as defined in claim 2 wherein said outlet from said temperature means includes
   h. a tube from the temperature means to within
   j. the free passage from the container to the animal drinking nipple.

7. The invention as defined in claim 2 wherein
   h. there are a plurality of animal drinking nipples connected to said container,
   j. each animal drinking nipple having an outlet from said temperature means directed therein.

8. The invention as defined in claim 7 wherein the outlet from the temperature means includes
   k. a plurality of tubes from the temperature means
   m. each tube to within the free passage from the container to one of the animal drinking nipples.

9. The invention as defined in claim 8 with the additional limitations of
   n. an overflow pipe within the container having
   o. an upper end above the float valve means level, and
   p. extending through the bottom of the container.

10. The invention as defined in claim 9 with the additional limitation of
   g. said temperature means being responsive to low temperatures within the container above water level therein.

11. The invention as defined in claim 10 with the additional limitations of r. said source of water under pressure including an underground pipe,
s. which enters the bottom of the container and
t. passes through the container to the valve means and temperature means.

* * * * *